T. W. TEMPLE.
IMPLEMENTS FOR OPENING OYSTERS.

No. 191,384.  Patented May 29, 1877.

Witnesses  Inventor
Geo. H. Strong  Thomas W. Temple
Jno. L. Borne  by Dewey
  Atty

UNITED STATES PATENT OFFICE.

THOMAS W. TEMPLE, OF LOS ANGELES, CALIFORNIA.

IMPROVEMENT IN IMPLEMENTS FOR OPENING OYSTERS.

Specification forming part of Letters Patent No. 191,384, dated May 29, 1877; application filed March 17, 1877.

*To all whom it may concern:*

Be it known that I, THOMAS W. TEMPLE, of the city and county of Los Angeles, and State of California, have invented an Improved Implement for Opening Oysters; and I do hereby declare the following to be a full, clear, and exact description thereof, reference being had to the accompanying drawings.

My invention relates to an improved hand tool or implement for opening oyster-shells after they have been split or separated by my splitting-machine, for which I have applied for Letters Patent of the United States; and it consists of a handle in which are secured two blades, one of which is fixed and the other adjustable, all as hereinafter more fully described and claimed.

Figure 1:
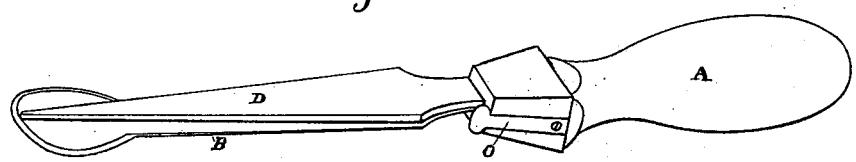
Figure 2:
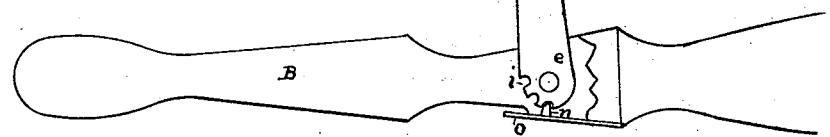

Referring to the accompanying drawings, Figure 1 is a perspective view of my improved implement; and Fig. 2 shows the same, partly in broken section, with the blades at right angles to each other.

A is the handle of the implement. In this handle I secure a fixed blade, B, which stands in a line with the handle. A short portion at the end of this blade I make in the form of an oval, and somewhat wider than the remainder of the blade. The entire edge of this rounded portion I sharpen, as represented.

Beside this blade B, I secure a spear-shaped or pointed blade, D, on the same rivet; but I round the base $e$ of this blade, so that it can be partially closed to stand at a right angle to the handle and fixed blade.

In the rounded base $e$, I make one or more notches, $i$. A spring, O, is secured to the handle opposite the rounded base of the blade, and it has a spur or projection, $n$, on it, which snaps into either of the notches $i$ as the turning of the blade brings them opposite to it.

This blade will be closed when it stands beside the blade B, and open when it is turned outward at an angle to it.

When in use the blade or spear D is opened, so that the spur of the spring catches in one of the notches, according to the position the person using it desires.

If the blade is fully open, so as to stand at right angles to the permanent blade, the user grasps the handle, so that the spear-blade will pass between his first and second fingers, in which position he can employ the spear-blade to pry open the split oyster-shells, while the oval point of blade B is used for scooping the oyster out of the half shell.

If the blade is partially closed, the user can simply grasp the handle and use the blades as above described.

This implement is simple and easily handled, and is quite effective as an oyster-opener.

Having thus described my invention, what I claim as new, and desire to secure by Letters Patent, is—

The above-described implement for opening oysters, consisting of the handle A, fixed blade B, with its oval-shaped point, and the spear-blade D, which is capable of being fixed at a convenient angle to the blade B, substantially as above described.

In witness whereof I have hereunto set my hand and seal.

THOMAS W. TEMPLE. [L. S.]

Witnesses:
 JOHN D. BICKNELL,
 J. R. McCONNELL.